United States Patent
Islam et al.

(10) Patent No.: US 12,358,403 B2
(45) Date of Patent: Jul. 15, 2025

(54) CHILD SEAT LATCHING SYSTEM FOR A VEHICLE

(71) Applicant: GM Global Technology Operations LLC, Detroit, MI (US)

(72) Inventors: Md Mhafuzul Islam, Warren, MI (US); Prakash M. Peranandam, Rochester Hills, MI (US); Erik Brandon Golm, Sterling Heights, MI (US); Manuel Forero Rueda, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 18/347,070

(22) Filed: Jul. 5, 2023

(65) Prior Publication Data
US 2025/0010767 A1 Jan. 9, 2025

(51) Int. Cl.
*B60N 2/28* (2006.01)
*B60N 2/26* (2006.01)

(52) U.S. Cl.
CPC ........... *B60N 2/2887* (2013.01); *B60N 2/268* (2023.08); *B60N 2/269* (2023.08)

(58) Field of Classification Search
CPC ....... B60N 2/2887; B60N 2/268; B60N 2/269
See application file for complete search history.

(56) References Cited

U.S. PATENT DOCUMENTS

| | | | |
|---|---|---|---|
| 9,550,454 B1 * | 1/2017 | Roisen | B60N 2/268 |
| 2020/0017066 A1 | 1/2020 | Goru et al. | |

FOREIGN PATENT DOCUMENTS

| | | | | |
|---|---|---|---|---|
| CN | 108275038 A | * | 7/2018 | ............ B60N 2/28 |
| CN | 216580227 U | * | 5/2022 | |
| DE | 4409971 A1 | | 9/1995 | |
| EP | 2269861 A1 | * | 1/2011 | ........... B60N 2/2806 |
| EP | 3699025 A1 | | 8/2020 | |

* cited by examiner

*Primary Examiner* — Milton Nelson, Jr.
(74) *Attorney, Agent, or Firm* — Vivacqua Crane, PLLC

(57) ABSTRACT

A child seat latching assembly for a vehicle is provided. The assembly comprises a child seat comprising a base portion having a base bar, a back portion having a back bar, and a first magnet generating a first magnetic field. The assembly further comprises a vehicle seat comprising a receiving portion having a base latch unit including a base connector comprising a base lock to secure the base bar in the base connector. The vehicle seat comprising a support portion having a back latch unit including a back connector comprising a back lock to secure the back bar in the back connector. The vehicle seat comprising a second magnet generating a second magnetic field in operation with the first magnetic unit. The first and second magnetic fields arranged to align the portable child seat with the vehicle seat when the first and second magnets are within a predetermined distance.

20 Claims, 7 Drawing Sheets

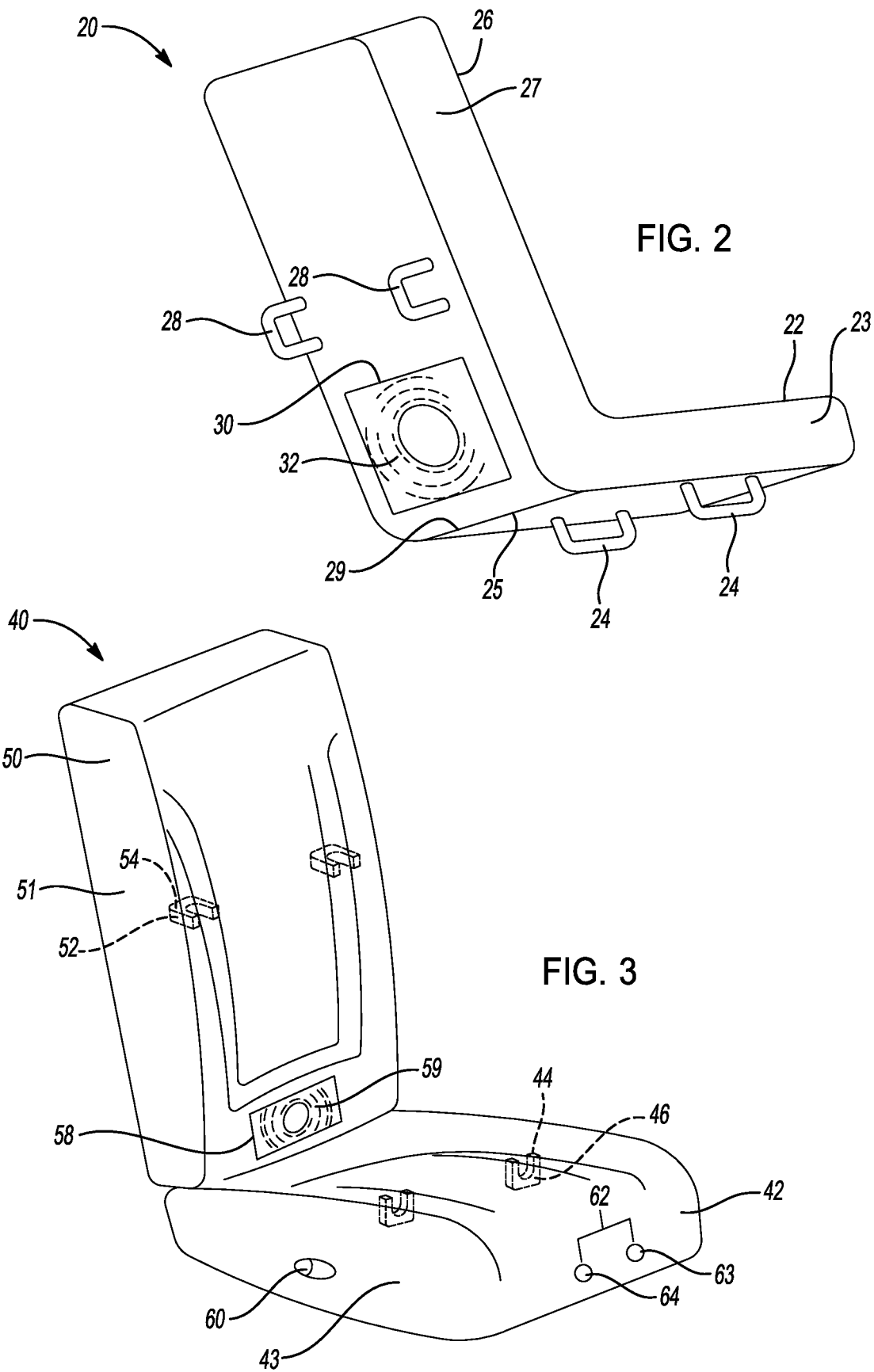

CHILD SEAT LATCHING SYSTEM FOR A VEHICLE

INTRODUCTION

The present disclosure relates to latching assemblies and, more particularly, front/rear-facing child seat latching systems for securement in a vehicle.

Current child seat assemblies may be considered heavy and bulky, typically involving relatively more time and effort for attachment or removal in a vehicle cabin. Over a duration of a car ride, a child seat position may potentially change without user awareness.

SUMMARY

Thus, while current child seat assemblies achieve their intended purpose, there is a need for a new and improved child seat latching assembly, and a system and method of controlling a child seat latching assembly for a vehicle.

In accordance with one aspect of the present disclosure, a child seat latching system for a vehicle is provided. The system comprises a portable child seat arranged to be securable in the vehicle. The portable child seat comprises a base portion comprising a first cushion and a base bar disposed therein for securement of the base portion in the vehicle. The base portion has a base edge.

The portable child seat further comprises a back portion comprising a second cushion and a back bar disposed therein for securement of the back portion in the vehicle. The back portion has a back edge connected to the base edge of the base portion such that the back portion extends vertically from the base portion. The portable child seat further comprises a first magnetic unit disposed on one of the base portion and the back portion. The first magnetic unit is arranged to generate and sense magnetic fields for alignment in the vehicle.

The system further comprises a stationary vehicle seat arranged to receive the portable child seat for securement in the vehicle. The stationary vehicle seat comprises a receiving portion comprising a third cushion and a base latch unit disposed therein to receive the base bar. The base latch unit comprises a base connector formed to receive the base bar. The base latch unit comprises a base sensor disposed on the base connector for sensing insertion of the base bar in the base connector and a base lock disposed on the base connector for locking the base bar in the base connector such that the base bar is locked therein when the base bar is inserted therein at a first distance for securement of the base portion to the receiving portion.

The stationary vehicle seat further comprises a support portion comprising a fourth cushion and a back latch unit disposed therein to receive the back bar. The back latch unit comprises a back connector formed to receive the back bar. The back latch unit comprises a back sensor disposed on the back connector for sensing insertion of the back bar in the back connector and a back lock disposed on the back connector for locking the back bar in the back connector such that the back bar is locked therein when the back bar is inserted therein at a second distance for securement of the back portion to the support portion.

The stationary vehicle seat further comprises a second magnetic unit arranged to generate and sense magnetic fields in operation with the first magnetic unit. The second magnetic unit is disposed on one of the receiving portions and the support portion such that the first and second magnetic units align the portable child seat with the vehicle seat for securement.

The system further comprises an electronic control unit (ECU) in communication with the first magnetic unit and the second magnetic unit. The ECU is arranged to control the first and second magnetic units for alignment of the portable child seat with the vehicle seat. The ECU is also in communication with the base latch unit to lock the base bar in the base connector when the base bar is inserted therein at the first distance. Also, the ECU is in communication with the back latch unit to lock the back bar in the back connector when the back bar is inserted therein at the second distance for securement of the portable child seat to the stationary vehicle seat.

In one embodiment, the base latch unit is embedded in the third cushion, the base bar extending from the first cushion into the third cushion such that the base connector receives the base bar therein for securement of the base portion to the receiving portion. The back latch unit is embedded in the fourth cushion. The back bar extends from the second cushion into the fourth cushion such that the back connector receives the back bar therein for securement of the back portion to the support portion.

In another embodiment, the base bar is embedded in the first portion. The base latch unit movably extends from the third cushion into the first cushion such that the base connector receives the base bar therein for securement of the base portion to the receiving portion. In yet another embodiment, the back bar is embedded in the second portion The back latch unit movably extends from the fourth cushion into the second cushion such that the back connector receives the back bar therein for securement of the back portion to the support portion.

In one embodiment, the ECU is in communication with the base latch unit to movably extend the base connector from the third cushion to receive the base bar therein. In another embodiment, the ECU is in communication with the back latch unit to movably extent the back connector from the fourth cushion to receive the back bar therein.

In one embodiment, the stationary vehicle seat comprises a release for unlocking the portable child seat therefrom, the release arranged to disengage the base bar from the base latch unit and the back bar from the back latch unit. In another embodiment, the stationary vehicle seat comprises a leveler for leveling the portable child seat relative to the stationary vehicle seat. In yet another embodiment, the base bar is a plurality of base bars and the back bar is a plurality of back bars. Moreover, the base latch unit is a plurality of base latch units and the back latch unit is a plurality of back latch units.

In accordance with another aspect of the present disclosure, a child seat latching assembly for a vehicle is provided. The assembly comprises a portable child seat arranged to be securable in the vehicle. The portable child seat comprises a base portion comprising a first cushion and a base bar disposed therein for securement of the base portion in the vehicle. The base portion has a base edge.

The portable child seat further comprises a back portion comprising a second cushion and a back bar disposed therein for securement of the back portion in the vehicle. The back portion has a back edge connected to the base edge of the base portion such that the back portion extends vertically from the base portion. The portable child seat further comprises a first magnet disposed on one of the base portion and the back portion. The first magnet is arranged to generate a first magnetic field for alignment in the vehicle.

The assembly further comprises a stationary vehicle seat arranged to receive the portable child seat for securement in the vehicle. The stationary vehicle seat comprises a receiving portion comprising a third cushion and a base latch unit disposed therein to receive the base bar. The base latch unit comprises a base connector formed to receive the base bar. The base latch unit comprises a base sensor disposed on the base connector for sensing insertion of the base bar in the base connector and a base lock disposed on the base connector for locking the base bar in the base connector such that the base bar is locked therein when the base bar is inserted therein at a first distance for securement of the base portion to the receiving portion.

The stationary vehicle seat further comprises a support portion comprising a fourth cushion and a back latch unit disposed therein to receive the back bar. The back latch unit comprises a back connector formed to receive the back bar. The back latch unit comprises a back sensor disposed on the back connector for sensing insertion of the back bar within the back connector and a back lock disposed on the back connector for locking the back bar in the back connector such that the back bar is locked therein when the back bar is inserted therein at a second distance for securement of the back portion to the support portion.

The stationary vehicle seat further comprises a second magnet arranged to generate a second magnetic field in operation with the first magnetic unit. The second magnet is disposed on one of the receiving portion and the support portion such that the first magnetic field is attracted to the second magnetic field to align the portable child seat with the vehicle seat when the first and second magnets are within a third distance.

In one embodiment, the base latch unit is embedded in the third cushion. The base bar extends from the first cushion into the third cushion such that the base connector receives the base bar therein for securement of the base portion to the receiving portion. In another embodiment, the back latch unit is embedded in the fourth cushion. The back bar extends from the second cushion into the fourth cushion such that the back connector receives the back bar therein for securement of the back portion to the support portion.

In one embodiment, the base bar is embedded in the first portion. The base latch unit movably extends from the third cushion and into the first cushion such that the base connector receives the base bar therein for securement of the base portion to the receiving portion. In another embodiment, the back bar is embedded in the second portion. The back latch unit movably extends from the fourth cushion and into the second cushion such that the back connector receives the back bar therein for securement of the back portion to the support portion. In this embodiment, the latch unit can then be moved back into the stationary vehicle seat providing tension and fixturing of the portable child seat thereto, thereby pulling the child seat towards the vehicle seat to hold the child seat relatively tight to the vehicle seat.

In another embodiment, the stationary vehicle seat comprises a release for unlocking the portable child seat therefrom. The release is arranged to disengage the base bar from the base latch unit and the back bar from the back latch unit. In yet another embodiment, the stationary vehicle seat comprises a leveler for leveling the portable child seat relative to the stationary vehicle seat.

In yet another aspect of the present disclosure, a method for latching a child seat assembly in a vehicle is provided. The method comprises providing a portable child seat arranged to be securable in the vehicle. The portable child seat comprises a base portion comprising a first cushion and a base bar disposed therein for securement of the base portion in the vehicle. The base portion has a base edge.

The portable child seat comprises a back portion comprising a second cushion and a back bar disposed therein for securement of the back portion in the vehicle. The back portion has a back edge connected to the base edge of the base portion such that the back portion extends vertically from the base portion.

The method further comprises providing a stationary vehicle seat arranged to receive the portable child seat for securement in the vehicle. The stationary vehicle seat comprises a receiving portion comprising a third cushion and a base latch unit disposed therein to receive the base bar. The base latch unit comprises a base connector formed to receive the base bar. The base latch unit comprises a base sensor disposed on the base connector for sensing insertion of the base bar in the base connector and a base lock disposed on the base connector for locking the base bar in the base connector such that the base bar is locked therein when the base bar is inserted therein at a first distance for securement of the base portion to the receiving portion.

The stationary vehicle seat further comprises a support portion comprising a fourth cushion and a back latch unit disposed therein to receive the back bar. The back latch unit comprises a back connector formed to receive the back bar. The back latch unit comprises a back sensor disposed on the back connector for sensing insertion of the back bar in the back connector and a back lock disposed on the back connector for locking the back bar in the back connector such that the back bar is locked therein when the back bar is inserted therein at a second distance for securement of the back portion to the support portion.

The method further comprises generating a first magnetic field with a first magnet from one of the base portion and the back portion of the portable child seat for alignment in the vehicle, and generating a second magnetic field with a second magnet from one of the receiving portion and the support portion of the vehicle seat.

The method further comprises aligning the portable child seat with the vehicle seat by attracting the portable child seat to the stationary vehicle seat with the first and second magnetic fields when the first and second magnets are within a third distance.

The method further comprises inserting the base bar in the base connector and sensing insertion of the base bar in the base connector. The method further comprises locking the base bar in the base connector when the base bar is inserted therein and sensed at a first distance for securement of the base portion to the receiving portion.

The method further comprises inserting the back bar in the back connector and sensing insertion of the back bar in the back connector. The method further comprises locking the back bar in the back connector when the back bar is inserted therein and sensed at a second distance for securement of the back portion to the support portion.

In one example, the method further comprises disengaging the base bar from the base latch unit and the back bar from the back latch unit to unlock the portable child seat from the stationary vehicle seat. In another example, the method further comprises leveling the portable child seat relative to the stationary vehicle seat when the base bar is locked in the base connector and the back bar is locked in the back connector.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a perspective view of a portable child seat of the assembly of the system in FIG. 1. according to one embodiment.

FIG. 3 is a perspective view of a stationary vehicle seat of the assembly of the system in FIG. 1 according to one embodiment.

DETAILED DESCRIPTION

The following description is merely exemplary in nature and is not intended to limit the present disclosure, application, or uses.

Embodiments and examples of the present disclosure provide child seat latching assemblies along with systems and methods of controlling a child seat latching assembly for securement in a vehicle. The child seat latching assembly involves relatively less time and effort to attach a portable child seat to a stationary vehicle seat. The system and method of controlling the child seat latching assembly provides alignment and securement of the child seat to the vehicle seat. Moreover, the system monitors the assembly and may provide updates/warnings as to the securement thereof, and in turn, providing tensioning between the child seat and the vehicle seat.

Figure 1:
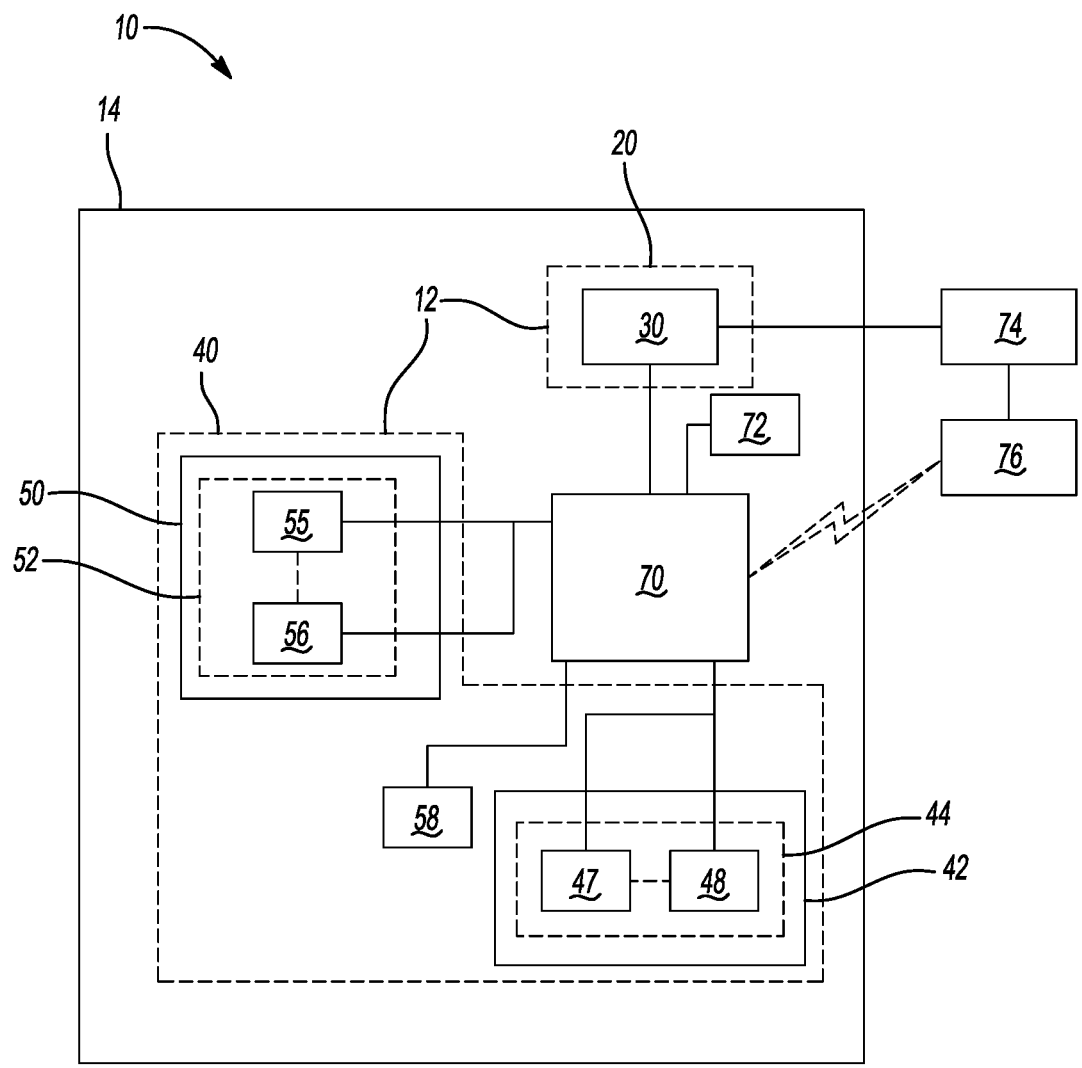
FIG. 1 is a schematic diagram of a system for controlling a child seat latching assembly for a vehicle in accordance with one embodiment of the present disclosure.

FIG. 1 illustrates a system 10 for controlling a child seat latching assembly 12 for a vehicle 14 in accordance with one embodiment of the present disclosure. As shown in FIGS. 1-2 the system 10 comprises a portable child seat 20 arranged to be securable in the vehicle 14. The portable child seat 20 comprises a base portion 22 comprising a first cushion 23 and a base bar 24 disposed therein for securement of the base portion 22 in the vehicle 14. In this embodiment, the base bar 24 extends outward from the first cushion 23 for securement in the vehicle 14. As further depicted, the base portion 22 has a base edge 25.

Referring to FIG. 2, the portable child seat 20 further comprises a back portion 26 comprising a second cushion 27 and a back bar 28 disposed therein for securement of the back portion 26 in the vehicle. In this embodiment, the back bar 28 extends outward from the second cushion 27 for securement in the vehicle. As further shown in FIG. 2, the back portion 26 has a back edge 29 that connects to the base edge 25 of the base portion 22 such that the back portion 26 extends vertically from the base portion 22 when the base portion 22 is on a horizontal plane.

As shown, the portable child seat 20 further comprises a first magnetic unit 30 disposed on one of the base portion 22 and the back portion 26. In this embodiment, the first magnetic unit 30 is disposed on the back portion 26. The first magnetic unit 30 is arranged to generate a first magnetic field 32 and sense other magnetic fields for alignment of the portable child seat 20 in the vehicle.

Figure 4:
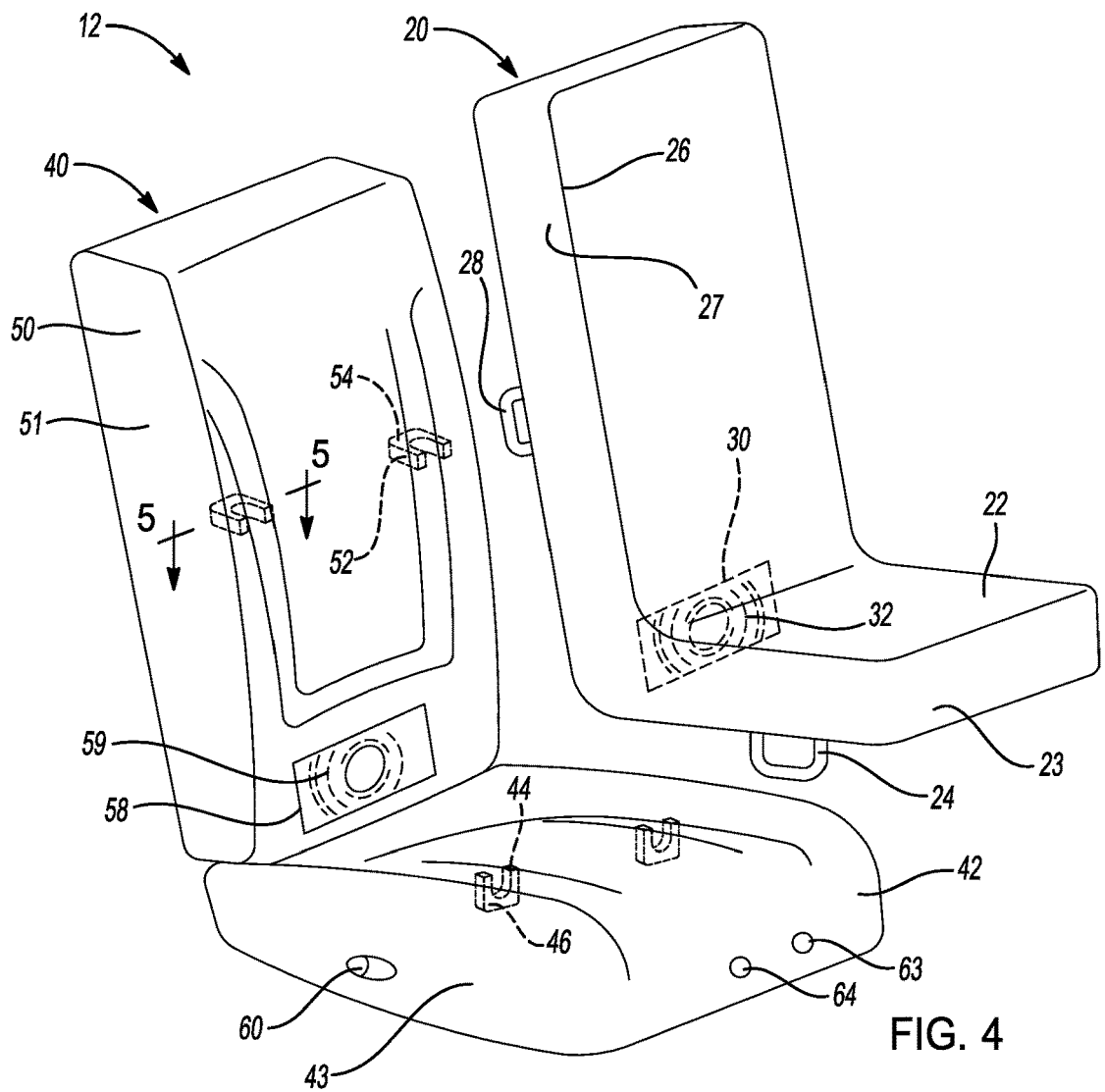
FIG. 4 is a perspective view of the portable child seat in FIG. 2 and the stationary vehicle seat in FIG. 3.
Figure 5:
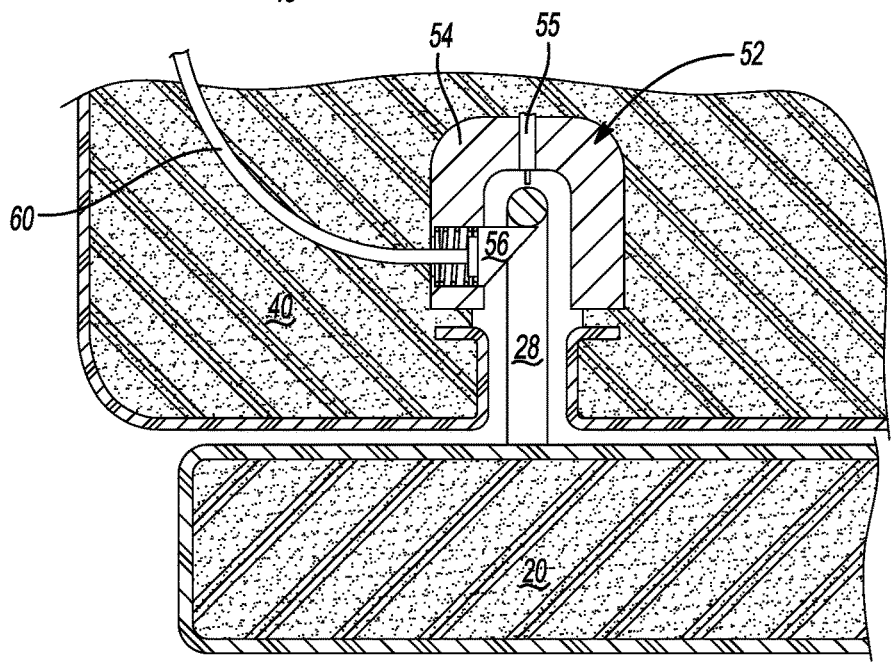
FIG. 5 is a cross-sectional top view of the stationary vehicle seat of FIG. 4 taken along lines 5-5 depicting a back latch unit thereof in accordance with one embodiment.

Referring to FIGS. 3-4, the system 10 further comprises a stationary vehicle seat 40 arranged to receive the portable child seat 20 for securement in the vehicle. The stationary vehicle seat 40 comprises a receiving portion 42 having a third cushion 43 and a base latch unit 44 disposed therein to receive the base bar 24. As depicted in FIGS. 3-5, the base latch unit 44 comprises a base connector 46 formed to receive the base bar 24.

FIGS. 3-5 illustrate that the base latch unit 44 comprises a base sensor 47 disposed on the base connector 46 for sensing insertion of the base bar 24 in the base connector 46. The base latch unit 44 further comprises a base lock 48 disposed on the base connector 46 for locking the base bar 24 in the base connector 46 such that the base bar 24 is secured therein when the base bar 24 is inserted therein at a first distance to secure of the base portion 22 of the portable child seat 20 to the receiving portion 42 of the stationary vehicle seat 40. In this embodiment, the base latch unit 44 is embedded in the third cushion 43. As shown, the base bar 24 extends from the first cushion 23 into the third cushion 43 such that the base connector 46 receives the base bar 24 therein for securement of the base portion 22 to the receiving portion 42.

Referring to FIGS. 3-5, the stationary vehicle seat 40 further comprises a support portion 50 comprising a fourth cushion 51 and a back latch unit 52 disposed therein to receive the back bar 28. As shown, the back latch unit 52 comprises a back connector 54 formed to receive the back bar 28. The back latch unit 52 comprises a back sensor 55 disposed on the back connector 54 for sensing insertion of the back bar 28 in the back connector 54. Moreover, the back latch unit 52 comprises a back lock 56 disposed on the back connector 54 for locking the back bar 28 in the back connector 54 such that the back bar 28 is locked therein when the back bar 28 is inserted therein at a second distance for securement of the back portion 26 to the support portion 50. As depicted, the back latch unit 52 is embedded in the fourth cushion 51. Further, the back bar 28 extends from the second cushion 27 into the fourth cushion 51 such that the back connector 54 receives the back bar 28 therein for securement of the back portion 26 to the support portion 50.

As further illustrated in FIGS. 3-4, the stationary vehicle seat 40 comprises a first magnetic unit 58 arranged to sense the first magnetic field 32 and generate a first magnetic field 59 in operation with the first magnetic field 32. The first magnetic unit 58 is disposed on one of the receiving portion 42 and the support portion 50. In this embodiment, the first magnetic unit 58 is disposed on the support portion 50 for alignment with the first magnetic unit 30. Moreover, the first magnetic unit 58 is arranged to align the portable child seat 20 with the vehicle seat via the first and second magnetic fields 32, 59, thereby engaging the portable child seat 20 with the stationary vehicle seat 40 when the first and second magnetic units 30, 58 are within a third distance to define an aligned position. It is to be understood that the first magnetic unit 30 may simply comprise a metal plate for attraction to the second magnetic unit as discussed below.

In one embodiment, the first and second magnetic units 30, 58 may generate dipolar (N and S) magnetic fields to attract and repel the portable child seat 20 to and from the stationary vehicle seat 40. For example, the first magnetic unit 30 may generate an N pole field and the first magnetic field 59 may generate an S pole field to attract the portable child seat 20 to the stationary vehicle seat 40. Along the same lines, the first magnetic unit 30 may generate an N pole field and the first magnetic field 59 may generate an N pole field to repel the portable child seat 20 from the stationary vehicle seat 40. Furthermore and as described in greater detail below, the first magnetic unit 58 is arranged to monitor the portable child seat 20 relative to the stationary vehicle seat 40 to maintain the aligned position.

Referring to FIG. 4, the stationary vehicle seat 40 may comprise a manual release 60 for unlocking the portable child seat 20 therefrom. Moreover, the release 60 is arranged to disengage the base bar 24 from the base latch unit 44 and the back bar 28 from the back latch unit 52. In one embodiment, the release 60 may be mechanically connected to the base lock 48 and back lock 56 by way of a wire or pulley such that movement (e.g., turning or rotating) of the release 60 will unlock the base lock 48 and back lock 56 to unlock the base bar 24 and back bar 28. It is to be understood that the release may be in communication with the ECU for electronic disengagement by way of any suitable manner without departing from the scope or spirit of the present disclosure.

Additionally, the stationary vehicle seat 40 may comprise a leveler 62 for leveling the portable child seat 20 relative to the stationary vehicle seat 40. That is, level switches 63, 64 may be arranged to horizontally move the third cushion 43 to thereby adjust the level of the base portion 22. The level switches 63, 64 may be configured in any suitable manner known to level vehicular seat cushions.

It is to be understood that the assembly 12 may comprise one base bar 24 or a plurality of base bars 24. Moreover, the assembly 12 may comprise one back bar 28 or a plurality of back bars 28. Further, the assembly 12 may comprise one base latch unit 44 or a plurality of base latch units 44. Additionally, the assembly 12 may comprise one back latch unit 52 or a plurality of back latch units 52.

Referring to FIGS. 1-4, the system 10 further comprises an electronic control unit (ECU) 70 in communication with the stationary vehicle seat 40, the portable child seat 20, a cabin display unit 72, a user device 74 (e.g. a hand-held smart phone), and a cloud server 76. Additionally, the ECU 70 is in communication with the cabin display unit 72, the first and second magnetic units 30, 58, the base latch unit 44 including the base sensor 47 and the base lock 48, and the back latch unit 52 including the back sensor 55 and back lock 56. Further, the ECU 70 may transmit and receive data signals to and from each of the cabin display unit 72, the cloud server 76, the first and second magnetic units 30, 58, the base latch unit 44 including the base sensor 47 and the base lock 48, and the back latch unit 52 including the back sensor 55 and back lock 56. In this embodiment, the ECU 70 is in communication with the cloud server 76 which, in turn, is in communication with the user device 74 and the portable child seat 20. Moreover, the cloud server 76 may transmit and receive data signals to and from each of the portable child seat 20 including the first magnetic unit 30, the user device 74 and the ECU 70. It is to be understood that any suitable cloud server 76, ECU 70, cabin display unit 72, and user device 74 may be used to achieve their respective functions as provided herein without departing from the spirit or scope of the present disclosure.

In this embodiment, the ECU 70 is arranged to identify the stationary vehicle seat 40 in the vehicle when a request for child seat latch assembly 12 activation is received. In one example, the ECU 70 receives a booking ticket/signal or an activation request from the user device 74 via the cloud server 76 for a car ride and for activation of the child seat latch assembly/system. The user device 74 is preferably equipped with a global positioning system (GPS) for determining a location of a user via the user device 74. In one embodiment, the vehicle may comprise a plurality of stationary vehicle seats 40 that may be activated to engage with the portable child seat 20. For example, the vehicle may comprise a first stationary vehicle seat disposed on one side (e.g., left side) of the vehicle and second stationary vehicle seat disposed on another side (e.g., right side) of the vehicle. In response to the request, the ECU 70 is arranged to identify and select one of the plurality of stationary vehicle seats 40 to be activated for engagement with the portable child seat 20 based on the GPS location of the user device 74 relative to the vehicle. Furthermore, the ECU 70 is arranged to activate the child seat latch assembly 12 to enable the base latch unit 44 and the back latch unit 52 for securement of the portable child seat 20 to the stationary vehicle seat 40.

In communication with the first and second magnetic units 30, 58, the ECU 70 is arranged to control the first and second magnetic units 30, 58 for alignment of the portable child seat 20 with the vehicle seat. That is, the ECU 70 activates the first and second magnetic units 30, 58 to generate their respective magnetic fields, e.g., N pole field and S pole field, thereby attracting the portable child seat 20 to the stationary vehicle seat 40 to the aligned position. In this embodiment, the second magnetic unit 58 is arranged to have a distance sensor 66 to monitor the portable child seat 20 relative to the stationary vehicle seat 40, thereby maintaining the aligned position. In one embodiment, the first magnetic unit 58 is arranged to monitor the base portion 22 relative to the receiving portion 42 and is arranged to monitor the back portion 26 relative to the support portion 50. In this embodiment, when the portable child seat 20 is within the third distance from the stationary vehicle seat 40, the distance sensor 66 may send a confirmation signal to the ECU 70, indicating that the aligned position has been reached. In an event of a change in the aligned position, the first magnetic unit 58 may send a warning signal to the ECU 70, indicating that a repositioning of the portable child seat 20 relative to the stationary vehicle seat 40 may be needed. In this example, the ECU 70 may be configured to inform/warn a driver or occupants in the vehicle by way of the cabin display unit 72. Other suitable options may be available to the driver/occupant without departing from the spirit or scope of the present disclosure.

Figure 6A:
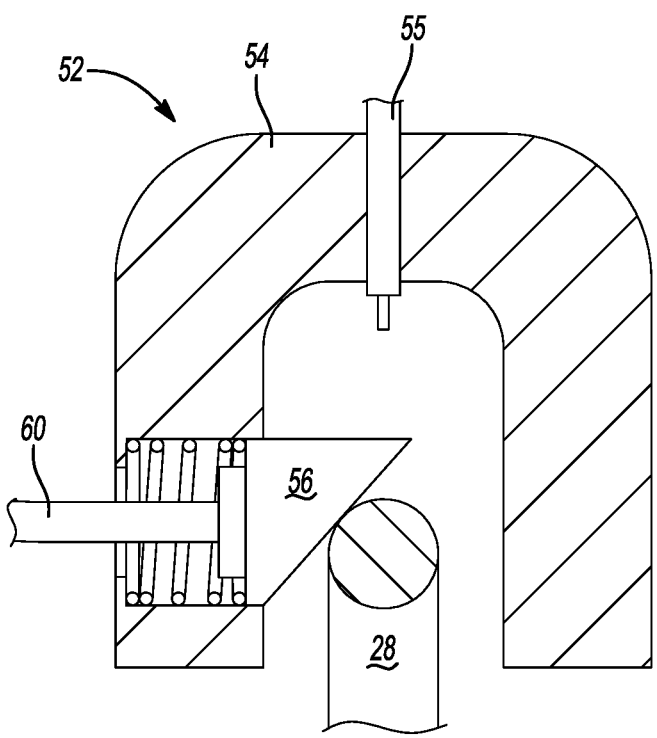
FIG. 6A is a top view of the back latch unit of the stationary vehicle.
Figure 6B:
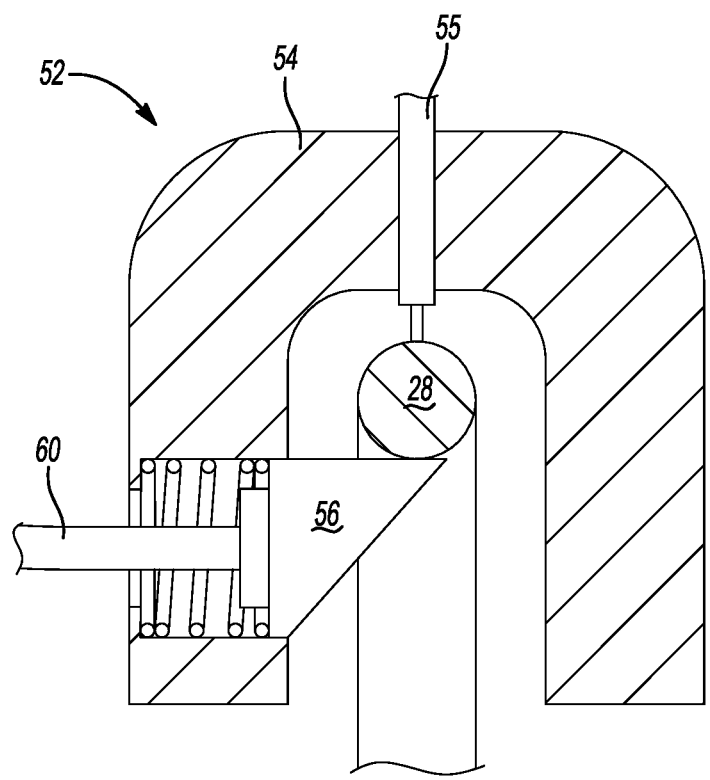
FIG. 6B is a top view of the back latch unit of FIG. 6A in a locked back position.

Referring the FIGS. 5-6, the ECU 70 is in communication with the base sensor 47 and the base latch unit 44 to lock the base bar 24 in the base connector 46 when the base bar 24 is inserted therein at the first distance. The base sensor 47 is arranged to sense the base bar 24 relative to the base connector 46 as the base bar 24 is inserted in the base connector 46. Moreover, the base latch unit 44 is arranged to lock the base bar 24 in the base connector 46 when the base bar 24 is sensed therein at the first distance for securement of the base portion 22 to the receiving portion 42 defining a locked base position. Hence, as the base bar 24 is inserted in the base connector 46, the base sensor 47 is configured to sense the base bar 24 at the first distance therefrom such that the base latch unit 44 may be activated to lock the base bar 24 therein. In operation, when the base sensor 47 senses the base bar 24 in the base connector 46 at or within the first distance therefrom, the base sensor 47 may send a lock signal to the ECU 70. In turn, the ECU 70 sends a signal to the base latch unit 44 to lock the base bar 24 within the base connector 46, thereby securing the base portion 22 to the receiving portion 42 in the locked base position.

Moreover, the base sensor 47 is arranged to monitor the locked base position. That is, by way of the sensing that the base bar 24 is within the first distance therefrom, the base sensor 47 is able to monitor the locked base position between the base portion 22 and the receiving portion 42. In this embodiment, when the base bar 24 is within the first distance from the base sensor 47, the base sensor 47 may send a confirmation signal to the ECU 70, indicating that the locked base position has been reached and/or is being maintained. In an event of a change in the locked base position, the base sensor 47 may send a warning signal to the ECU 70, indicating that a repositioning of the base portion 22 relative to the receiving portion 42 may be needed. In this example, the ECU 70 may be configured to inform/warn a driver or occupants in the vehicle by way of the cabin display unit 72. Other suitable options may be available to the driver/occupant without departing from the spirit or scope of the present disclosure.

In this embodiment, the ECU 70 is in communication with the back sensor 55 and the back latch unit 52 to lock the back bar 28 in the back connector 54 when the back bar 28 is inserted therein at the second distance. The back sensor 55 is arranged to sense the back bar 28 relative to the back connector 54 as the back bar 28 is inserted in the back connector 54. Moreover, the back latch unit 52 is arranged to lock the back bar 28 in the back connector 54 when the back bar 28 is sensed therein at the second distance for securement of the back portion 26 to the support portion 50 defining a locked back position. Hence, as the back bar 28 is inserted in the back connector 54, the back sensor 55 is configured to sense the back bar 28 at the second distance therefrom such that the back latch unit 52 may be activated to lock the back bar 28 therein. In operation, when the back sensor 55 senses the back bar 28 in the back connector 54 at or within the second distance therefrom, the back sensor 55 may send a lock signal to the ECU 70. In turn, the ECU 70 sends a signal to the back latch unit 52 to lock the back bar 28 within the back connector 54, thereby securing the back portion 26 to the support portion 50 in the locked back position.

Moreover, the back sensor 55 is arranged to monitor the locked back position. That is, by way of sensing that the back bar 28 is within the second distance therefrom, the back sensor 55 is able to monitor the locked back position between the back portion 26 and the support portion 50. In this embodiment, when the back bar 28 is within the second distance from the back sensor 55, the back sensor 55 may send a confirmation signal to the ECU 70, indicating that the locked back position has been reached and/or is being maintained. In an event of a change in the locked back position, the back sensor 55 may send a warning signal to the ECU 70, indicating that a repositioning of the back portion 26 relative to the support portion 50 may be needed. In this example, the ECU 70 may be configured to inform/warn a driver or occupants in the vehicle by way of the cabin display unit 72. Other suitable options may be available to the driver/occupant without departing from the spirit or scope of the present disclosure.

In this embodiment, the ECU 70 is arranged to depower the first and second magnetic fields 32, 59 when a request for child seat latch assembly deactivation is received. That is, upon arrival to a trip destination, the ECU 70 sends an end signal to the first and second magnetic units 30, 58 to depower the first and second magnetic fields 32, 59. Once the first and second magnetic units 30, 58 are depowered, the ECU 70 is arranged to unlock the base bar 24 from the base connector 46 and the back bar 28 from the back connector 54 to disengage the portable child seat 20 from the stationary vehicle seat 40. That is, upon depowering of the first and second magnetic units 30, 58, the ECU 70 sends a signal to the base latch unit 44 and the back lock 56 unit to unlock the base lock 48 and back lock 56, respectively. In turn, the base bar 24 is unlocked from the base connector 46 and the back bar 28 is unlocked from the back connector 54. Upon unlocking the base bar 24 and back bar 28, the ECU 70 determines that the child seat latch assembly is deactivated.

As the ECU 70 receives signals from and transmits signals to various components as discussed above, it is to be understood that the ECU 70 may send signals to the cabin display unit 72 (e.g., located on a dashboard in a vehicle) such that the cabin display unit 72 may show status updates or warnings to users, provide control options to users, and receive inputs therefrom regarding control options of the system.

It is to be understood that at least one of the cloud server 76 and the ECU 70 may comprise a number of algorithms and modules having algorithms to achieve tasks provided herein. For example, the cloud server 76 and the ECU 70 may comprise a user/vehicle registration module to validate users and vehicles. Moreover, the cloud server 76 and ECU 70 may comprise a resource discovery module to monitor and record the location of the vehicle 14 and user device 74. Further, the cloud server 76 and the ECU 70 may comprise an image processing (including face recognition and positioning) module to recognize and position the user based on visual domain data. Additionally, the cloud server 76 and the ECU 70 may comprise a user identification and personalization module to store user identification and personalized settings thereof.

Figure 7:
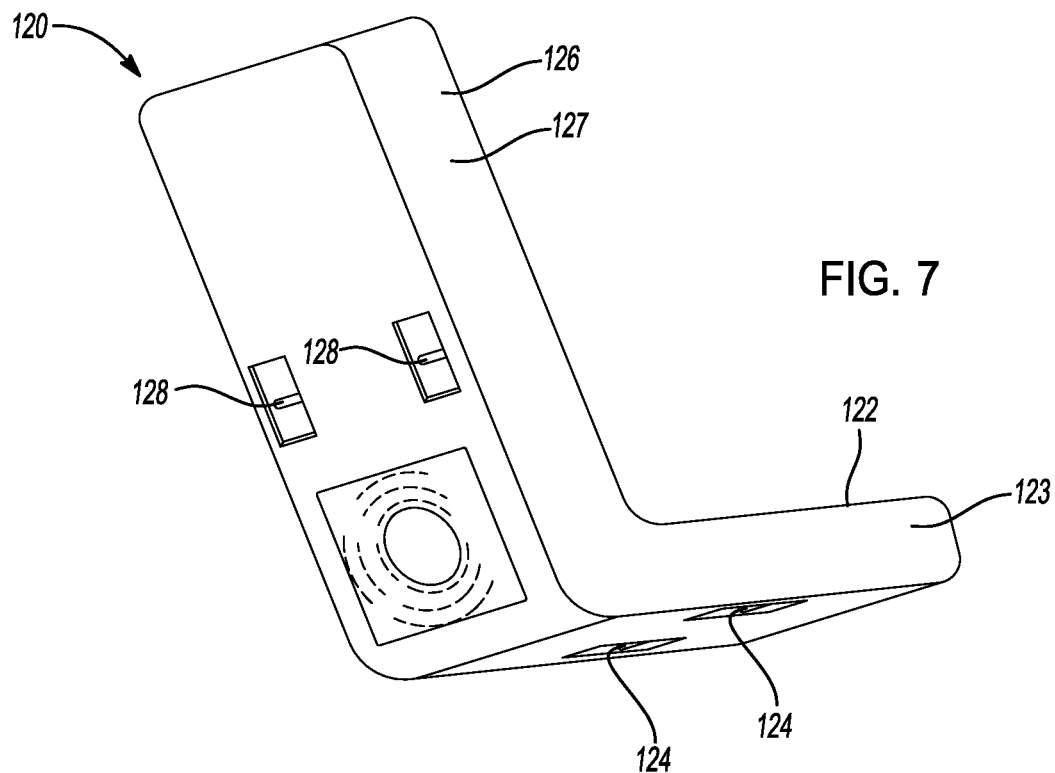
FIG. 7 is a perspective view of a portable child seat of the assembly of the system in FIG. 1. in accordance with another embodiment.

FIG. 7 illustrates a child seat latching assembly 112 that may be implemented by the system 10 described above and depicted in FIG. 1 in accordance with another embodiment of the present disclosure. As shown, the assembly 112 has a portable child seat 120 and comprises a base portion 122 and a back portion 126 similar to the embodiment described above. However, in this embodiment, the base portion 122 comprises a first cushion 123 and a base bar 124 embedded therein. Moreover, the back portion 126 comprises a second cushion 127 and a back bar 128 embedded therein. Moreover, the embedded bars will enable multiple child seats to be stacked for storage.

Figure 8A:
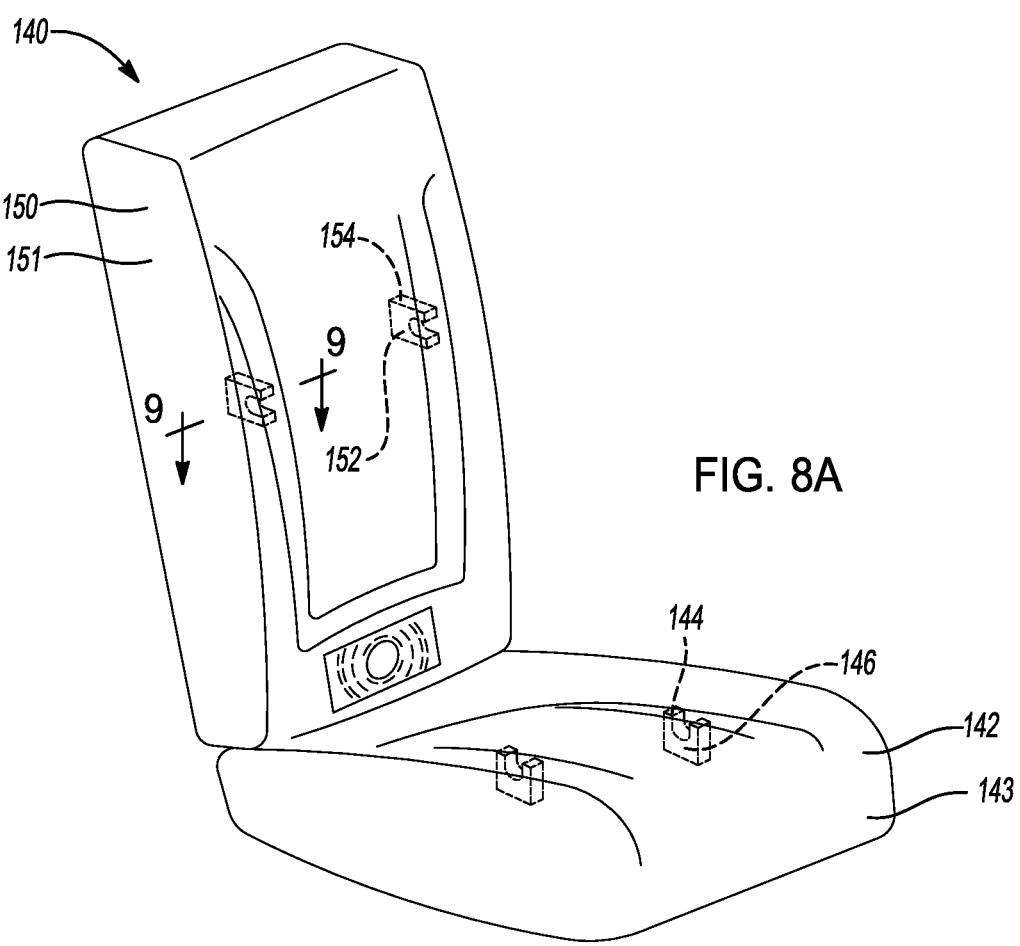
FIG. 8A is a perspective view of a stationary vehicle seat of the assembly in FIG. 1 in accordance with another embodiment.
Figure 8B:
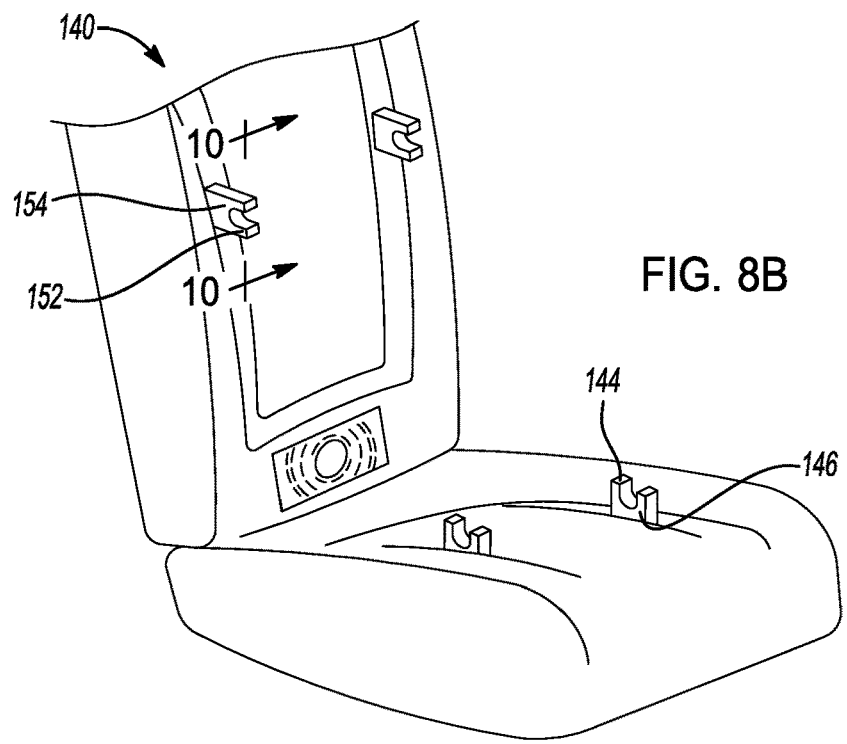
FIG. 8B is a perspective view of the stationary vehicle seat in FIG. 8A having base lock units and back lock units extending therefrom.

Referring to FIGS. 8A-8B, the assembly 112 further comprises a stationary vehicle seat 140 having a receiving portion 142 and a support portion 150. As shown, the receiving portion 142 comprises a third cushion 143 and a base latch unit 144 similar to the embodiment described above. However, in this embodiment, the base latch unit 144 movably extends from the third cushion 143. In operation, the base latch unit 144 movably extends from the third cushion 143 into the first cushion 123 such that a base connector 146 receives the base bar 124 therein for securement of the base portion 122 to the receiving portion 142. As the ECU 70 is in communication with the base latch unit 144, the ECU 70 may send a signal to the base latch unit 144 to movably extend the base connector 146 from the third cushion 143 to receive the base bar 124 therein. It is understood that the base connector 146 may movably extend by any suitable manner such as a servo motor without departing from the spirit or scope of the present disclosure.

Figure 9:
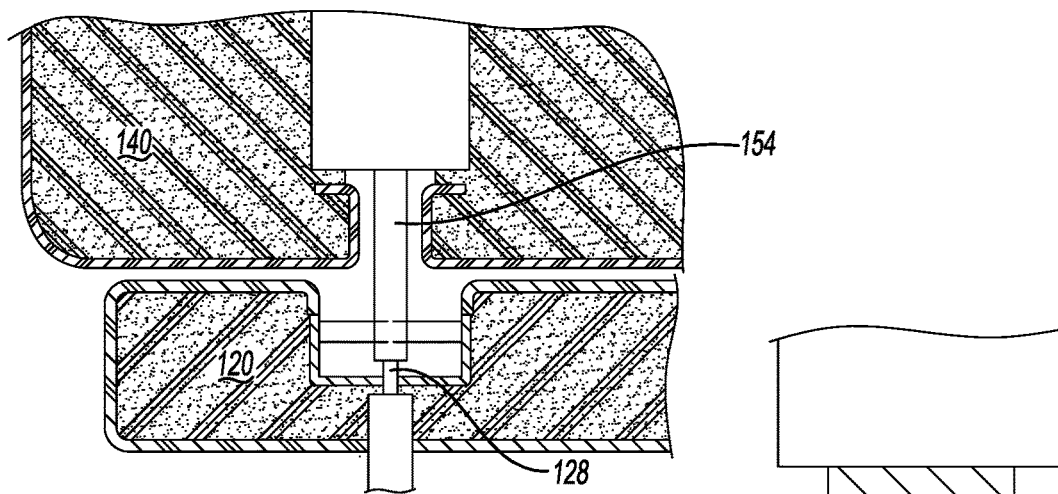
FIG. 9 is a cross-sectional top view of the stationary vehicle seat in FIG. 8 taken along lines 9-9 depicting a back latch unit thereof.
Figure 10:
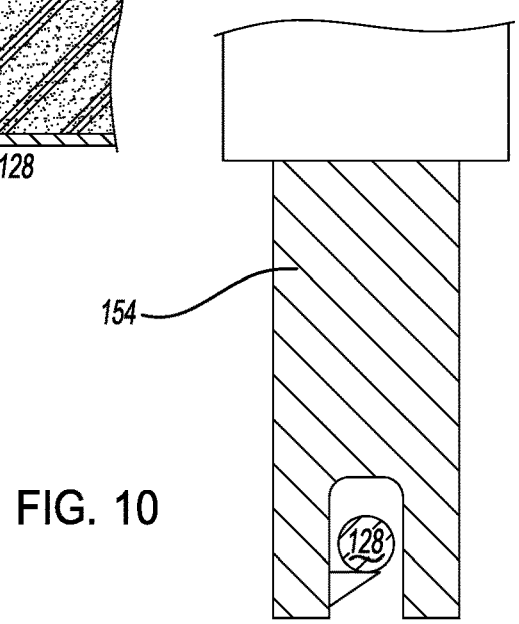
FIG. 10 is a side view of the back latch unit in FIG. 9.

Referring to FIGS. 8A-10, the support portion 50 comprises a fourth cushion 51 and a back latch unit 52 similar to the embodiment discussed above. However, in this embodiment, the back latch unit 52 movably extends from the fourth cushion 51. Referring to FIGS. 9-10, in operation, the back latch unit 52 movably extends from the fourth cushion 51 into the second cushion 27 such that the back connector 54 receives the back bar 28 therein for securement of the back portion 26 to the support portion 50. As the ECU 70 is in communication with the back latch unit 52, the ECU 70 may send a signal to the back latch unit 52 to movably extend the back connector 54 from the fourth cushion 51 to receive the back bar 28 therein. It is understood that the back connector 54 may movably extend by any suitable manner such as a servo motor without departing from the spirit or scope of the present disclosure. In this embodiment, the portable child seat can also be pulled back towards the vehicle seat by way of a motor to provide fixturing of the child seat to the vehicle seat.

Figure 11:
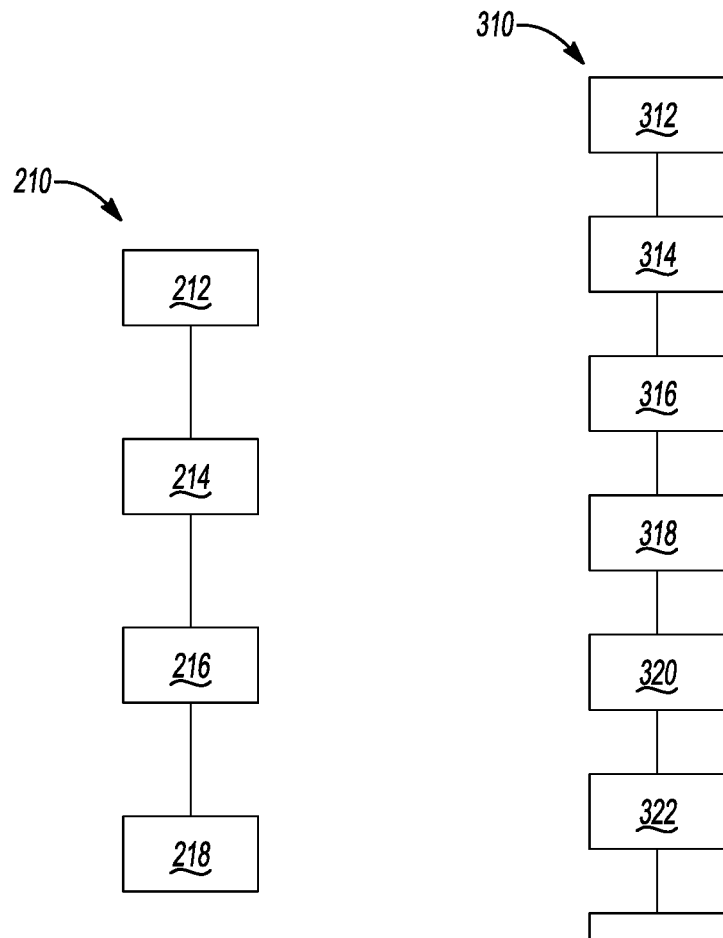
FIG. 11 is a flowchart of a general process for controlling the child seat latch system in FIG. 1.

FIG. 11 illustrates a flowchart of a general process 210 for controlling the child seat latch assembly 12 in FIGS. 1-6. As shown in box 212, a step of stationary vehicle seat identification is conducted. Moreover, in box 214, a step of portable child seat fixing (aligning) is achieved. Additionally, in box 216, a step of portable child seat locking and lock monitoring is conducted. Furthermore, in box 218, a step of portable child seat unlocking and unlock monitoring is completed.

Figure 12:
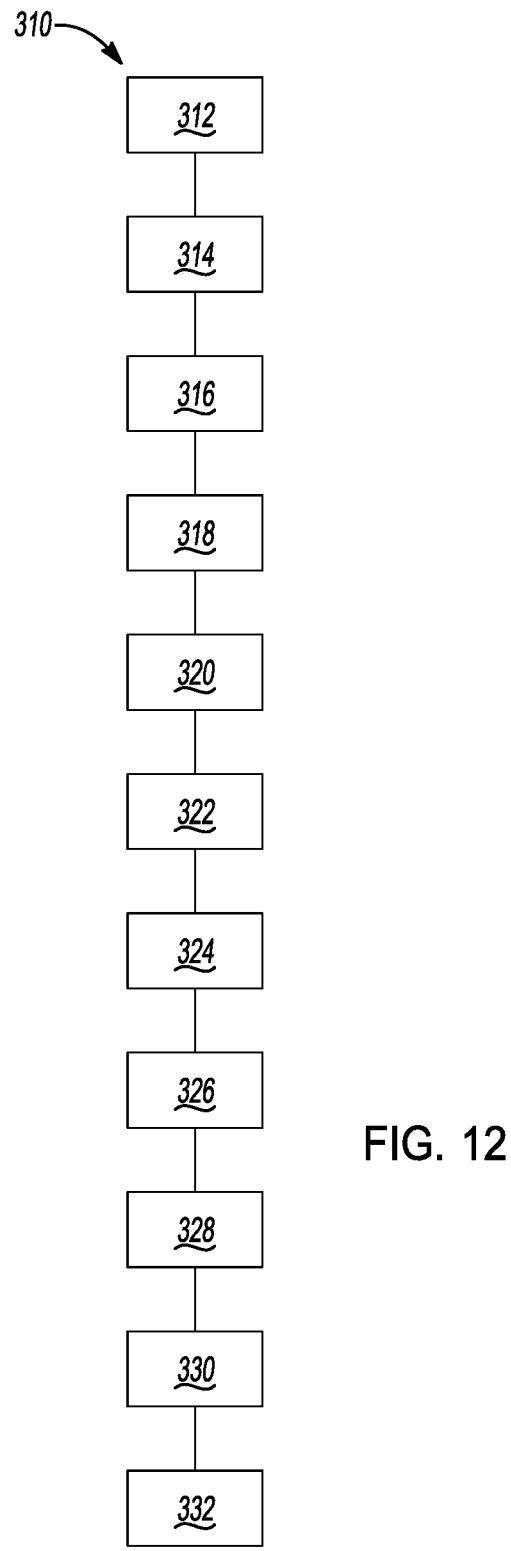
FIG. 12 is a flowchart of a method of controlling the child seat latch system in FIG. 1 in accordance with one example of the present disclosure.

FIG. 12 depicts a method 310 of controlling the child seat latch assembly 12 in accordance with one example of the present disclosure. As shown, the method comprises in box 312 providing a portable child seat 20 arranged to be securable in the vehicle 14 (generally, box 212 stationary vehicle seat identification). In this example, the method implements the system 10 in FIG. 1 discussed above including the portable child seat shown in FIGS. 2-6.

Referring to FIG. 12, the method further comprises in box 314 identifying a stationary vehicle seat 40 in the vehicle when a request for child seat latch assembly activation is received (generally, box 212 stationary vehicle seat identification). In this example, the method implements the stationary vehicle seat 40 discussed above and shown in FIGS. 1-6. As discussed above, the ECU 70 is arranged to identify the stationary vehicle seat 40 in the vehicle when a request for child seat latch assembly activation is received. In one example, the ECU 70 receives a booking ticket/signal or an activation request from the user device 74 via the cloud server 76 for a car ride and for activation of the child seat latch assembly/system. The user device 74 is preferably equipped with a global positioning system (GPS) for determining a location of a user via the user device 74.

In one embodiment, the vehicle may comprise a plurality of stationary vehicle seats 40 that may be activated to engage with the portable child seat 20. For example, the vehicle may comprise a first stationary vehicle seat disposed on one side (e.g., left side) of the vehicle and second stationary vehicle seat disposed on another side (e.g., right side) of the vehicle. In response to the request, the ECU 70 is arranged to identify and select one of the plurality of stationary vehicle seats 40 to be activated for engagement with the portable child seat 20 based on the GPS location of the user device 74 relative to the vehicle.

In turn and referring back to FIG. 12, the method further comprises in box 316 activating the child seat latch system to enable the base latch unit 44 and the back latch unit 52 of the identified stationary vehicle seat 40 for securement of the portable child seat 20 thereto (generally, box 212 stationary vehicle seat identification). As such, the ECU 70 is arranged to activate the child seat latch system, thereby enabling the base latch unit 44 and the back latch unit 52 for receiving and securement of the portable child seat 20 to the stationary vehicle seat 40. It is to be understood that box 316 activating the child seat may include pulling or attracting the child seat towards the vehicle seat to provide tension therebetween for a relatively tight fituring between the child seat and the vehicle seat. As an example, one of the vehicle seat and the child seat may have a servo motor arranged to engage the child seat closer to the vehicle seat.

FIG. 12 illustrates the method further comprising in box 318 aligning the portable child seat 20 with the vehicle seat by generating the first and second magnetic fields 32, 59 to engage the portable child seat 20 with the stationary vehicle seat 40 when the first and second magnets are within the third distance defining an aligned position (generally, box 214 portable child seat fixing). In communication with the first and second magnetic units 30, 58, the ECU 70 is arranged to control the first and second magnetic units 30, 58 for alignment of the portable child seat 20 with the vehicle seat. That is, the ECU 70 activates the first and second magnetic units 30, 58 to generate their respective magnetic fields, e.g., N pole field and S pole field, thereby attracting the portable child seat 20 to the stationary vehicle seat 40 to the aligned position. In this example, the second magnetic unit 58 is arranged to have a distance sensor 66 to monitor the portable child seat 20 relative to the stationary vehicle seat 40, thereby maintaining the aligned position. In one example, the first magnetic unit 58 is arranged to monitor the base portion 22 relative to the receiving portion 42 and is arranged to monitor the back portion 26 relative to the support portion 50. In operation, when the portable child seat 20 is within the third distance from the stationary vehicle seat 40, the distance sensor 66 may send a confirmation signal to the ECU 70, indicating that the aligned position has been reached. In an event of a change in the aligned position, the first magnetic unit 58 may send a warning signal to the ECU 70, indicating that a repositioning of the portable child seat 20 relative to the stationary vehicle seat 40 may be needed. In this example, the ECU 70 may be configured to inform/warn a driver or occupants in the vehicle by way of the cabin display unit 72. Other suitable options may be available to the driver/occupant without departing from the spirit or scope of the present disclosure.

In FIG. 12, the method further comprises in box 320 sensing the base bar 24 relative to the base connector 46 to insert the base bar 24 therein when the portable child seat 20 is aligned with the vehicle seat. In the embodiment described above, the base sensor 47 is arranged to sense the base bar 24 relative to the base connector 46 as the base bar 24 is inserted in the base connector 46. The ECU 70 is in communication with the base sensor 47 and the base latch unit 44 to lock the base bar 24 in the base connector 46 when the base bar 24 is inserted therein at the first distance.

Referring the FIG. 12, the method further comprises in box 322 locking the base bar 24 in the base connector 46 when the base bar 24 is sensed therein at the first distance for securement of the base portion 22 to the receiving portion 42 defining a locked base position (generally, in box 216 portable child seat locking and lock monitoring). That is, the base latch unit 44 is arranged to lock the base bar 24 in the base connector 46 when the base bar 24 is sensed therein at the first distance for securement of the base portion 22 to the receiving portion 42 defining a locked base position. Hence, as the base bar 24 is inserted in the base connector 46, the base sensor 47 is configured to sense the base bar 24 at the first distance therefrom such that the base latch unit 44 may be activated to lock the base bar 24 therein. In operation, when the base sensor 47 senses the base bar 24 in the base connector 46 at or within the first distance therefrom, the base sensor 47 may send a lock signal to the ECU 70. In turn, the ECU 70 sends a signal to the base latch unit 44 to lock the base bar 24 within the base connector 46, thereby securing the base portion 22 to the receiving portion 42 in the locked base position.

Referring back to FIG. 12, the method further comprises in box 324 sensing the back bar 28 relative to the back connector 54 to insert the back bar 28 therein when the portable child seat 20 is aligned with the vehicle seat. In the embodiment described above, the back sensor 55 is arranged to sense the back bar 28 relative to the back connector 54 as the back bar 28 is inserted in the back connector 54. The ECU 70 is in communication with the back sensor 55 and the back latch unit 52 to lock the back bar 28 in the back connector 54 when the back bar 28 is inserted therein at the second distance.

Referring the FIG. 12, the method further comprises in box 326 locking the back bar 28 in the back connector 54 when the back bar 28 is sensed therein at the second distance for securement of the back portion 26 to the support portion 50 defining a locked back position. That is, the back latch unit 52 is arranged to lock the back bar 28 in the back connector 54 when the back bar 28 is sensed therein at the second distance for securement of the back portion 26 to the support portion 50 defining a locked back position. Hence, as the back bar 28 is inserted in the back connector 54, the back sensor 55 is configured to sense the back bar 28 at the second distance therefrom such that the back latch unit 52 may be activated to lock the back bar 28 therein. In operation, when the back sensor 55 senses the back bar 28 in the back connector 54 at or within the second distance therefrom, the back sensor 55 may send a lock signal to the ECU 70. In turn, the ECU 70 sends a signal to the back latch unit 52 to lock the back bar 28 within the back connector 54, thereby securing the back portion 26 to the support portion 50 in the locked back position.

The method further comprises in box 328 monitoring the portable child seat 20 relative to the stationary vehicle seat 40 to maintain the aligned position, the locked base position, and the locked back position. In one example, the base sensor 47 is arranged to monitor the locked base position. That is, by way of sensing that the base bar 24 is within the first distance therefrom, the base sensor 47 is able to monitor the locked base position between the base portion 22 and the receiving portion 42. In this example, when the base bar 24 is within the first distance from the base sensor 47, the base sensor 47 may send a confirmation signal to the ECU 70, indicating that the locked base position has been reached and/or is being maintained. In an event of a change in the locked base position, the base sensor 47 may send a warning signal to the ECU 70, indicating that a repositioning of the base portion 22 relative to the receiving portion 42 may be needed. In this example, the ECU 70 may be configured to inform/warn a driver or occupants in the vehicle by way of the cabin display unit 72. Other suitable options may be available to the driver/occupant without departing from the spirit or scope of the present disclosure.

Moreover, the back sensor 55 is arranged to monitor the locked back position. That is, by way of sensing that the back bar 28 is within the second distance therefrom, the back sensor 55 is able to monitor the locked back position between the back portion 26 and the support portion 50. In this example, when the back bar 28 is within the second distance from the back sensor 55, the back sensor 55 may send a confirmation signal to the ECU 70, indicating that the locked back position has been reached and/or is being maintained. In an event of a change in the locked back position, the back sensor 55 may send a warning signal to the ECU 70, indicating that a repositioning of the back portion 26 relative to the support portion 50 may be needed. In this example, the ECU 70 may be configured to inform/warn a driver or occupants in the vehicle by way of the cabin display unit 72. Other suitable options may be available to the driver/occupant without departing from the spirit or scope of the present disclosure.

FIG. 12 depicts that the method further comprises in box 330 depowering the first and second magnetic fields 32, 59 when a determination for child seat latch assembly deactivation is completed. In this example, the ECU 70 is arranged to depower the first and second magnetic fields 32, 59 when a request for child seat latch assembly deactivation is received. That is, upon arrival to a trip destination, the ECU 70 sends an end signal to the first and second magnetic units 30, 58 to depower the first and second magnetic fields 32, 59.

The method further comprises in box 332 unlocking the base bar 24 from the base connector 46 and the back bar 28 from the back connector 54 to disengage the portable child seat 20 from the stationary vehicle seat 40 upon depowering the first and second magnetic fields 32, 59 (generally, in box 218 portable child seat unlocking and unlock monitoring). In the example, once the first and second magnetic units 30, 58 are depowered, the ECU 70 is arranged to unlock the base bar 24 from the base connector 46 and the back bar 28 from the back connector 54 to disengage the portable child seat 20 from the stationary vehicle seat 40. That is, upon depowering of the first and second magnetic units 30, 58, the ECU 70 sends a signal to the base latch unit 44 and the back lock 56 unit to unlock the base lock 48 and back lock 56, respectively. In turn, the base bar 24 is unlocked from the base connector 46 and the back bar 28 is unlocked from the back connector 54. Upon unlocking the base bar 24 and back bar 28, the ECU 70 determines that the child seat latch assembly is deactivated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A child seat latching system for a vehicle, the system comprising:
  a portable child seat arranged to be securable in the vehicle, the portable child seat comprising:

a base portion comprising a first cushion and a base bar disposed therein for securement of the base portion in the vehicle, the base portion having a base edge;

a back portion comprising a second cushion and a back bar disposed therein for securement of the back portion in the vehicle, the back portion having a back edge connected to the base edge of the base portion such that the back portion extends vertically from the base portion; and a first magnetic unit disposed on one of the base portion and the back portion, the first magnetic unit arranged to generate and sense magnetic fields for alignment in the vehicle, a stationary vehicle seat arranged to receive the portable child seat for securement in the vehicle, the stationary vehicle seat comprising:

a receiving portion comprising a third cushion and a base latch unit disposed therein to receive the base bar, the base latch unit comprising a base connector formed to receive the base bar, the base latch unit comprising a base sensor disposed on the base connector for sensing insertion of the base bar in the base connector and a base lock disposed on the base connector for locking the base bar in the base connector such that the base bar is locked therein when the base bar is inserted therein at a first distance for securement of the base portion to the receiving portion;

a support portion comprising a fourth cushion and a back latch unit disposed therein to receive the back bar, the back latch unit comprising a back connector formed to receive the back bar, the back latch unit comprising a back sensor disposed on the back connector for sensing insertion of the back bar in the back connector and a back lock disposed on the back connector for locking the back bar in the back connector such that the back bar is locked therein when the back bar is inserted therein at a second distance for securement of the back portion to the support portion; and a second magnetic unit arranged to generate and sense magnetic fields in operation with the first magnetic unit, the second magnetic unit disposed on one of the receiving portion and the support portion such that the first and second magnetic units align the portable child seat with the vehicle seat for securement; and an electronic control unit (ECU) in communication with the first magnetic unit and the second magnetic unit, the ECU arranged to control the first and second magnetic units for alignment of the portable child seat with the vehicle seat, the ECU in communication with the base latch unit to lock the base bar in the base connector when the base bar is inserted therein at the first distance, the ECU in communication with the back latch unit to lock the back bar in the back connector when the back bar is inserted therein at the second distance for securement of the portable child seat to the stationary vehicle seat.

2. The system of claim 1 wherein the base latch unit is embedded in the third cushion, the base bar extending from the first cushion into the third cushion such that the base connector receives the base bar therein for securement of the base portion to the receiving portion.

3. The system of claim 1 wherein the back latch unit is embedded in the fourth cushion, the back bar extending from the second cushion into the fourth cushion such that the back connector receives the back bar therein for securement of the back portion to the support portion.

4. The system of claim 1 wherein the base bar is embedded in the base portion, the base latch unit movably extending from the third cushion and into the first cushion such that the base connector receives the base bar therein for securement of the base portion to the receiving portion.

5. The system of claim 4 wherein the ECU is in communication with the base latch unit to movably extend the base connector from the third cushion to receive the base bar therein.

6. The system of claim 1 wherein the back bar is embedded in the back portion, the back latch unit movably extending from the fourth cushion and into the second cushion such that the back connector receives the back bar therein for securement of the back portion to the support portion.

7. The system of claim 6 wherein the ECU is in communication with the back latch unit to movably extend the back connector from the fourth cushion to receive the back bar therein.

8. The system of claim 1 wherein the stationary vehicle seat comprises a release for unlocking the portable child seat therefrom, the release arranged to disengage the base bar from the base latch unit and the back bar from the back latch unit.

9. The system of claim 1 wherein the stationary vehicle seat comprises a leveler for leveling the portable child seat relative to the stationary vehicle seat.

10. The system of claim 1 wherein the base bar is a plurality of base bars, the back bar is a plurality of back bars, the base latch unit is a plurality of base latch units, and the back latch unit is a plurality of back latch units.

11. A child seat latching assembly for a vehicle, the assembly comprising:

a portable child seat arranged to be securable in the vehicle, the portable child seat comprising:

a base portion comprising a first cushion and a base bar disposed therein for securement of the base portion in the vehicle, the base portion having a base edge;

a back portion comprising a second cushion and a back bar disposed therein for securement of the back portion in the vehicle, the back portion having a back edge connected to the base edge of the base portion such that the back portion extends vertically from the base portion; and a first magnet disposed on one of the base portion and the back portion, the first magnet arranged to generate a first magnetic field for alignment in the vehicle, a stationary vehicle seat arranged to receive the portable child seat for securement in the vehicle, the stationary vehicle seat comprising:

a receiving portion comprising a third cushion and a base latch unit disposed therein to receive the base bar, the base latch unit comprising a base connector formed to receive the base bar, the base latch unit comprising a base sensor disposed on the base connector for sensing insertion of the base bar in the base connector and a base lock disposed on the base connector for locking the base bar in the base connector such that the base bar is locked therein when the base bar is inserted therein at a first distance for securement of the base portion to the receiving portion;

a support portion comprising a fourth cushion and a back latch unit disposed therein to receive the back bar, the back latch unit comprising a back connector formed to receive the back bar, the back latch unit comprising a back sensor disposed on the back connector for sensing insertion of the back bar within the back connector and a back lock disposed on the back connector for locking the back bar in the back connector such that the back bar is locked therein when the back bar is inserted therein at a second distance for securement of the back portion to the support portion; and a second magnet arranged to generate a second magnetic field in operation with the first magnet, the second magnet disposed on one of the receiving portion and the support portion such that the first magnetic field is attracted to the second magnetic field to align the portable child seat with the vehicle seat when the first and second magnets are within a third distance.

12. The assembly of claim 11 wherein the base latch unit is embedded in the third cushion, the base bar extending from the first cushion into the third cushion such that the base connector receives the base bar therein for securement of the base portion to the receiving portion.

13. The assembly of claim 11 wherein the back latch unit is embedded in the fourth cushion, the back bar extending from the second cushion into the fourth cushion such that the back connector receives the back bar therein for securement of the back portion to the support portion.

14. The assembly of claim 11 wherein the base bar is embedded in the base portion, the base latch unit movably extending from the third cushion and into the first cushion such that the base connector receives the base bar therein for securement of the base portion to the receiving portion.

15. The assembly of claim 11 wherein the back bar is embedded in the back portion, the back latch unit movably extending from the fourth cushion and into the second cushion such that the back connector receives the back bar therein for securement of the back portion to the support portion.

16. The assembly of claim 11 wherein the stationary vehicle seat comprises a release for unlocking the portable child seat therefrom, the release arranged to disengage the base bar from the base latch unit and the back bar from the back latch unit.

17. The assembly of claim 11 wherein the stationary vehicle seat comprises a leveler for leveling the portable child seat relative to the stationary vehicle seat.

18. A method for latching a child seat assembly in a vehicle, the method comprising:
providing a portable child seat arranged to be securable in the vehicle, the portable child seat comprising:
a base portion comprising a first cushion and a base bar disposed therein for securement of the base portion in the vehicle, the base portion having a base edge;
a back portion comprising a second cushion and a back bar disposed therein for securement of the back portion in the vehicle, the back portion having a back edge connected to the base edge of the base portion such that the back portion extends vertically from the base portion; and providing a stationary vehicle seat arranged to receive the portable child seat for securement in the vehicle, the stationary vehicle seat comprising:
a receiving portion comprising a third cushion and a base latch unit disposed therein to receive the base bar, the base latch unit comprising a base connector formed to receive the base bar, the base latch unit comprising a base sensor disposed on the base connector for sensing insertion of the base bar in the base connector and a base lock disposed on the base connector for locking the base bar in the base connector such that the base bar is locked therein when the base bar is inserted therein at a first distance for securement of the base portion to the receiving portion;
a support portion comprising a fourth cushion and a back latch unit disposed therein to receive the back bar, the back latch unit comprising a back connector formed to receive the back bar, the back latch unit comprising a back sensor disposed on the back connector for sensing insertion of the back bar in the back connector and a back lock disposed on the back connector for locking the back bar in the back connector such that the back bar is locked therein when the back bar is inserted therein at a second distance for securement of the back portion to the support portion;
generating a first magnetic field with a first magnet from one of the base portion and the back portion of the portable child seat for alignment in the vehicle;
generating a second magnetic field with a second magnet from one of the receiving portion and the support portion of the vehicle seat;
aligning the portable child seat with the vehicle seat by attracting the first and second magnetic fields when the first and second magnets are within a third distance;
inserting the base bar in the base connector;
sensing insertion of the base bar in the base connector;
locking the base bar in the base connector when the base bar is inserted therein and sensed at a first distance for securement of the base portion to the receiving portion;
inserting the back bar in the back connector;
sensing insertion of the back bar in the back connector; and
locking the back bar in the back connector when the back bar is inserted therein and sensed at a second distance for securement of the back portion to the support portion.

19. The method of claim 18 further comprising disengaging the base bar from the base latch unit and the back bar from the back latch unit to unlock the portable child seat from the stationary vehicle seat.

20. The method of claim 18 further comprising leveling the portable child seat relative to the stationary vehicle seat when the base bar is locked in the base connector and the back bar is locked in the back connector.

* * * * *